Oct. 11, 1960 A. G. W. JIPP 2,956,126

START-STOP TELEPRINTER SYSTEM

Filed May 22, 1957 2 Sheets-Sheet 1

Inventor:
August Jipp
By [signature] Atty.

Oct. 11, 1960 A. G. W. JIPP 2,956,126

START-STOP TELEPRINTER SYSTEM

Filed May 22, 1957 2 Sheets-Sheet 2

Inventor.
August Jipp.
By. [signature] Atty.

2,956,126

START-STOP TELEPRINTER SYSTEM

August Georg Wilhelm Jipp, Munich-Solln, Germany, assignor to Siemens and Halske Aktiengesellschaft, Berlin and Munich, Germany, a German corporation Filed May 22, 1957, Ser. No. 660,981

11 Claims. (Cl. 178—69.5)

Figures 1A, 1B, 1C, 1D:
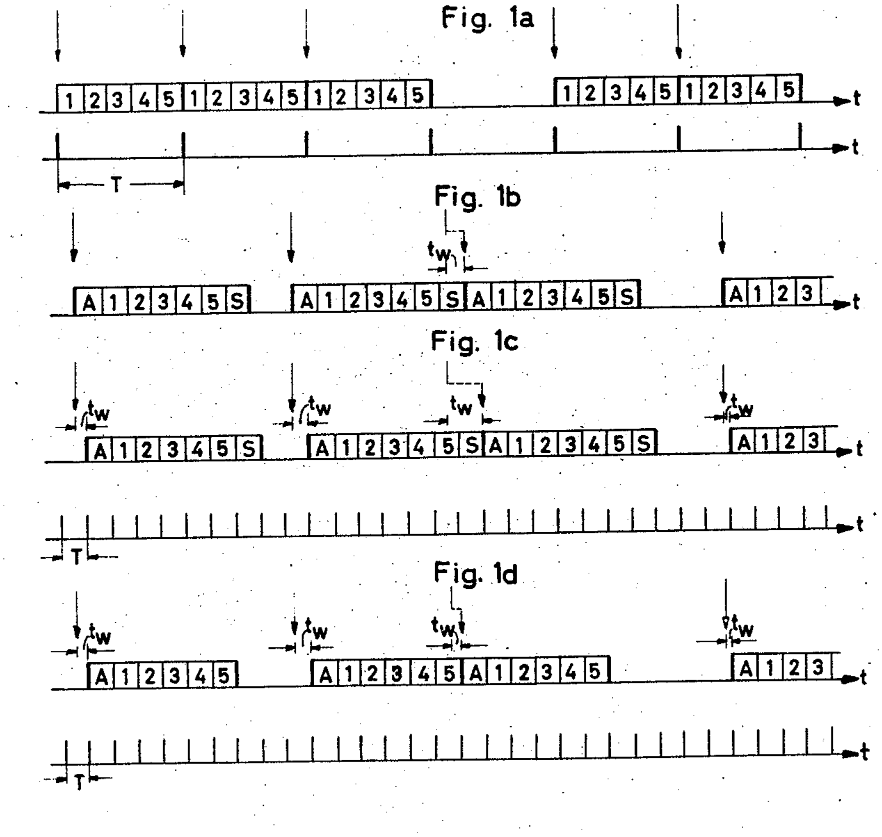

The present invention relates to a start-stop teleprinter system in which the signals are composed of binary elements of uniform duration.

The oldest telegraph apparatus operated, aside from special types, in general in accordance with a counting method in which the individual pulses which act at intervals one after the other either moved a step-by-step mechanism forward by a number of steps corresponding to the number of the pulses or else, utilizing a change in length of the individual pulse, represented the symbols to be transmitted (letters, digits, punctuation) by combinations of short and long pulses of varying number. Representatives of the first type were pointer telegraphy and representatives of the second type Morse telegraphy.

It constituted a great advance in telegraph technique when the change was effected from instruments of the indicated type to systems in which the telegraph signals for the representation of the symbols to be transmitted are composed of a constant number of individual elements of constant duration which follow each other without spacing. The introduction of such coding systems with telegraph signals of uniform length, favored the construction of mechanically operating teleprinters.

The earlier representatives of this category of telegraph equipment were synchronous telegraphs, the operation of which was based on the continuous maintenance of synchronism between the transmitter and the receiver. Based on this principle, a theoretically optimum utilization of the line is possible, but the synchronous telegraphs had the disadvantage that upon the actuation of the keys at the transmitting station, the tempo prescribed by the synchronous system had to be precisely maintained and thus operation was possible only by trained personnel. A further disadvantage was that after each new insertion of the apparatus cumbersome preparations were necessary to produce synchronism before the actual transmitting of the corresponding message could be started. Accordingly, there entered into question practically only continuous communications with relatively long periods of operation. A short communication between different stations in the manner of communication between subscribers was not possible. For these reasons, telegraph apparatus of the synchronous type could not gain a footing in business operations or in economic life.

The next important step in overcoming these disadvantages resided in the development of the start-stop system in which the operation of the transmitting instrument is no longer bound to the prescribed cadence of the synchronous system but is adapted as in the case of an office typewriter to the nonsynchronous manner of operation of the person using the typewriter. Based upon this principle, it was possible to construct teletypewriters which can be operated by any typist and can be connected together as required for intercommunication as in the case of telephones. For operation in addition to the connecting of one's own machine and the connecting of the motor of the machine of the desired subscriber, which connection is effected by remote control over a line in a simple manner, no further measures are necessary. Thus after this connection the writing can be started immediately.

In view of these great advantages of the start-stop teleprinter which made possible the creation of extensive communication systems, the poorer line utilization as compared with synchronous telegraphs was willingly tolerated. This poorer line efficiency is due to the fact that aside from the characteristic element's required to represent the individual symbols—as a rule five—there is also required in each case a start element of equal length which precedes said elements in order to start the operating rate of the transmitter and receiver necessary for the signal in question, and a stop element which is different from the start element and follows the characteristic elements in order to assure a minimum spacing before the next signal. This stop element or pulse has at least the length of a standard element, for instance 20 ms., but must under certain conditions, namely, in view of distortion-correcting devices connected in a lengthy line or for transfer to multiplex synchronous telegraphy, be increased to one and a half times the length of a unit element, that is, for instance 30 ms.

Taking as basis a five-element alphabet to describe the symbols to be transmitted, the use of the start-stop system therefore represents an impairment of the line utilization in the ratio of 5:7 or 5:7.5 as compared with the synchronous system in which the five elements can be transmitted without interval one after the other. This poorer line efficiency would undoubtedly have prevented a further expansion of teletypewriters in telecommunications and restricted their application to municipal systems if it were not for the great progress made at the same time in the development of line technique, with creation of low-cost teleprinter channels by multiple utilization.

A further fundamental disadvantage of start-stop teletypewriters as compared with synchronous telegraphs is doubled sensitivity to line distortions, for instance, displacements and deformations of the commencement of the elements such as caused by the properties of the lines and other transmission means, for instance relays and the like. As a result of such influences, the commencement and the end both of the start pulse and of all other pulses of a signal can be shifted so as to be erroneous. In themselves such distortions will naturally occur upon every telegraph pulse transmission and therefore also in the case of synchronous telegraphy, but in equipment of this type, the effect is not multiplied since the scanning of the characteristic elements which takes place for each element received in a comparatively short period of time (scanning moment) at the theoretical center of the element, is stipulated with respect to its tempo or cadence by the continuous synchronization. The permissible displacement of the commencement and the end of such an element can therefore in the case of synchronized telegraphy amount to almost one-half of the length of an element before the danger of erroneous reproduction of the transmitted signal arises.

In the start-stop teletypewriter of the customary construction on the other hand, in addition to the distortion of the characteristic elements itself, there is also the possible distortion of the commencement of the start element with respect to the subsequent characteristic elements by which the commencement of the operating cadence of the receiver is improperly displaced with respect to what it should be and thus also a corresponding defective displacement of all scanning moments can occur within the operating cadence after it has been introduced. This distortion adds itself to the possible individual distortion of the characteristic elements, so that for each of the two distortions only half the value can be permitted as compared with synchronous telegraphy. The resultant distortion is known as reference distortion.

This feature of the start-stop teletypewriter also makes the supervision from the standpoint of measuring technique of the teletypewriter communications difficult and necessitated the development of special reference distortion meters in addition to the previously customary distortion meters.

The invention is based on recognition of the fact that increased sensitivity of the start-stop teletypewriters with respect to line distortions is the main reason for the extremely increased requirements as to accuracy in the manufacture and operation of the equipment and at the same time the main obstacle in the way of further increase in the line utilization.

The object of the invention is therefore to reduce the sensitivity of teletypewriter equipment operating in accordance with the start-stop principle to distortions caused by the lines and other transmission means to the lower value existing in synchronous telegraphy without thereby giving up the other considerable advantages of the start-stop system.

This object is achieved in accordance with the invention by arranging at the transmitting office the elements of each teletypewriter signal to be transmitted already by the time of transmission, positively in a temporally rigid element pattern, which is in fixed phase relation to the driving frequency (for instance the driving RPM) of the transmitting teletypewriter and has a pattern pulse frequency which corresponds to the reciprocal of the desired element length, and controlling in the receiving teletypewriter apparatus, after each release of one operating cycle (for instance a revolution of the receiving distributor), effected by the start element of a teletypewriter signal, the evaluation of the individual elements of the teletypewriter signal, during the operating cycle which has been released, by a temporally invariable element lattice brought into phase synchronism with the element lattice of the transmitted teletypewriter signal.

In the case of the customary element length of the teletypewriter signals of 20 ms., the rule given by the invention means that the rigid element pattern has a pulse frequency of 50 elements per second and that the commencement in time of each transmitted teletypewriter signal with respect to the striking of the keys, which as before is effected arbitrarily and therefore at no set rate, can be displaced by a maximum of 20 ms. and therefore on the average of 10 ms. By this displacement, which has no effect on the key actuation and does not for all practical purposes make itself noticeable in the operation, there is obtained the great advantage that the transmitted teletypewriter signals are arranged already at the transmitting office with their individual elements into a rigid temporal pattern and accordingly can be received by a receiver which operates in accordance with the start-stop principle but is synchronized with the element pattern of the transmitting machine, without the additional influence of the distortions of the commencement of the start elements having an effect. This means for the transmission the same low sensitivity to line and other transmission distortions as in the case of the said synchronous telegraphy.

A further considerable advantage of the invention resides in the possibility of simplifying greatly the anti-distortion means required in the case of long lines. Since the teletypewriter signals transmitted in accordance with the principle of the invention have their individual elements arranged in a rigid temporal raster, this element raster can also be taken as basis for the manner of operation of the anti-distortion means, so that such means need not operate with a cadence corresponding to the total length of the teletypewriter signals, released in each case by the start element of each teletypewriter signal, but can be operated with the continuous pulse frequency corresponding to the reciprocal of the element length and therefore to the transmitting pattern. Each relay transmission can thus, by simple coupling with an impulser synchronized with the transmitting element pattern, be developed into a complete anti-distortion device. In particular, in the case of a synchronization of the element pattern of all connected teletypewriter machines, used uniformly for a large teletypewriter system, it is possible to obtain in this way a great simplification of the distortion removal technique and accordingly an extensive use of anti-distortion devices. The stop element in this connection need in principle only have the same length as the unit element, that is, customarily 20 ms., so that the impairment of the line utilization otherwise caused by the fact that the stop element is of one and a half times unit length is eliminated.

It is also of essential importance for the practical feasibility of the new teletypewriter system in accordance with the invention that by the retention in principle of the start-stop system and the customary unit length, both of the start elements and the characteristic elements of the teletypewriter signals, cooperation is in itself possible with the already existing teletypewriters operated without element synchronization although in case of such a transitional solution naturally the advantage of the elimination of the additional influence of the start-element distortion is not utilized.

If such consideration of the possibility of collaboration with teletypewriter machines of the previously customary type is not required, the invention may also be realized by retaining only the start element while entirely dispensing with the stop element. The line utilization as compared with synchronous telegraphy can be thereby improved, again taking the five element code as basis, to the ratio of 5:6.

Use is already made of the principle of arranging the elements in a phase-rigid pattern in the known phase classifiers which are used at the place of transfer from a transmission system operating in the customary manner asynchronously with normal teletypewriter machines to a transmission system operating by nature synchronously, for instance with multiplex distributors, in order to arrange the asynchronously arriving teletypewriter signals in the tempro prescribed by the synchronous system. It would therefore in itself also be possible to carry out the invention with logical application of such known phase classifiers by coupling a normal teletypewriter machine in the transmitting office directly with a phase classifier, but such an arrangement would require an additional expense as compared with a teletypewriter machine constructed from the very start in accordance with the principle of the invention.

The invention is suitably achieved by synchronizing the driving frequencies (for instance driving r.p.m.) of interconnected but individually operable start-stop teletypewriters, at least during the time of operative connection.

The synchronizing of the driving frequency (for instance driving r.p.m.) of the receiving teletypewriter may be effected by the commencement of the elements of the received teletypewriter signals by the use of integrating means acting in the known manner. This is intended to mean, that current supervision of the coincidence of the commencement of the elements of the received teletypewriter signals with the corresponding moments of the operating rhythm of the receiving teletypewriter takes place and that deviations recorded during this supervision and varying between positive and negative values are averaged in each case over a certain time interval, which extends over several teletypewriter signals, and evaluated for a corresponding synchronization correction of the frequency or phase of the drive only upon deviations of this average value from the desired value of zero. The means which are to be employed for this purpose may be identical with known means employed for receiver synchronization in character and image transmission.

The invention may be realized providing for a fixed phase relationship of the element pattern, which is active in the receiving teletypewriter and controls the evaluation of the individual elements of each received teletypewriter signal, to the synchronized drive frequency (drive r.p.m.) of the receiving teletypewriter, which phase relationship however can be currently corrected by the commencement of the elements of the received teletypewriter signals. Known means may again be provided, as used for synchronous telegraphy, which act to provide current phase correction of the element pattern active in the receiving teletypewriter and controlling the evaluation of the individual elements of each received teletypewriter signal. By such means, the result is obtained that the phase agreement of the actual commencement of the elements of the received teletypewriter signals with the corresponding moments of the element pattern controlling the scanning is continuously supervised and only upon deviation of the error averaged over a certain period of time, for instance for the duration of several teletypewriter signals, from the desired value of zero, is a corresponding correction of the phase position of the element pattern controlling the scanning effected.

In order to assure from the very start of a connection the correct starting position for the phase of the element pattern which controls the scanning and to avoid the troublesome expenditure of time for an introductory phase interception with inherent danger of mutilation of signals, one can in accordance with a further feature of the invention proceed by effecting after each connection of a receiving teletypewriter, the phase interception, that is, the single setting of the phase of the element pattern which is active in the receiving teletypewriter and controls the evaluation of the individual elements of each received teletypewriter signal, by the start elements of the first teletypewriter signal received.

Figure 2:
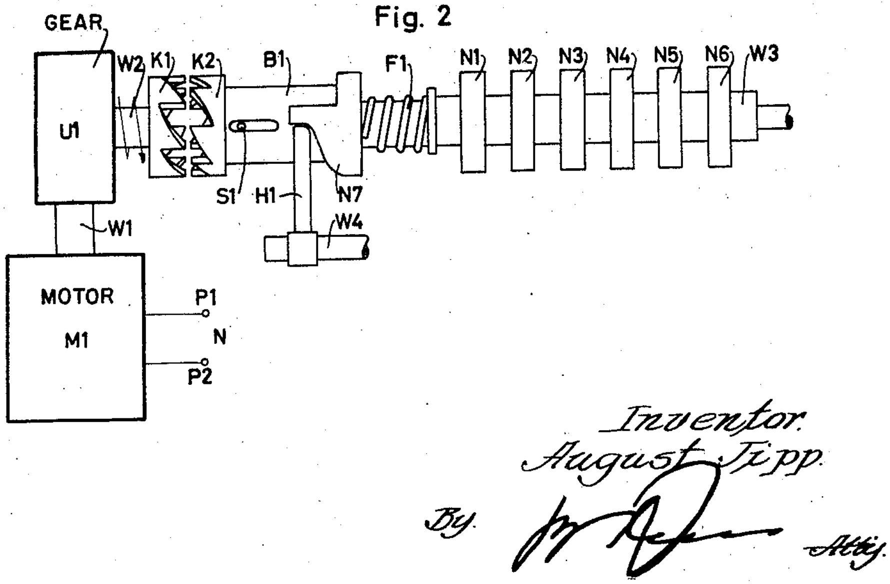
Figure 3:
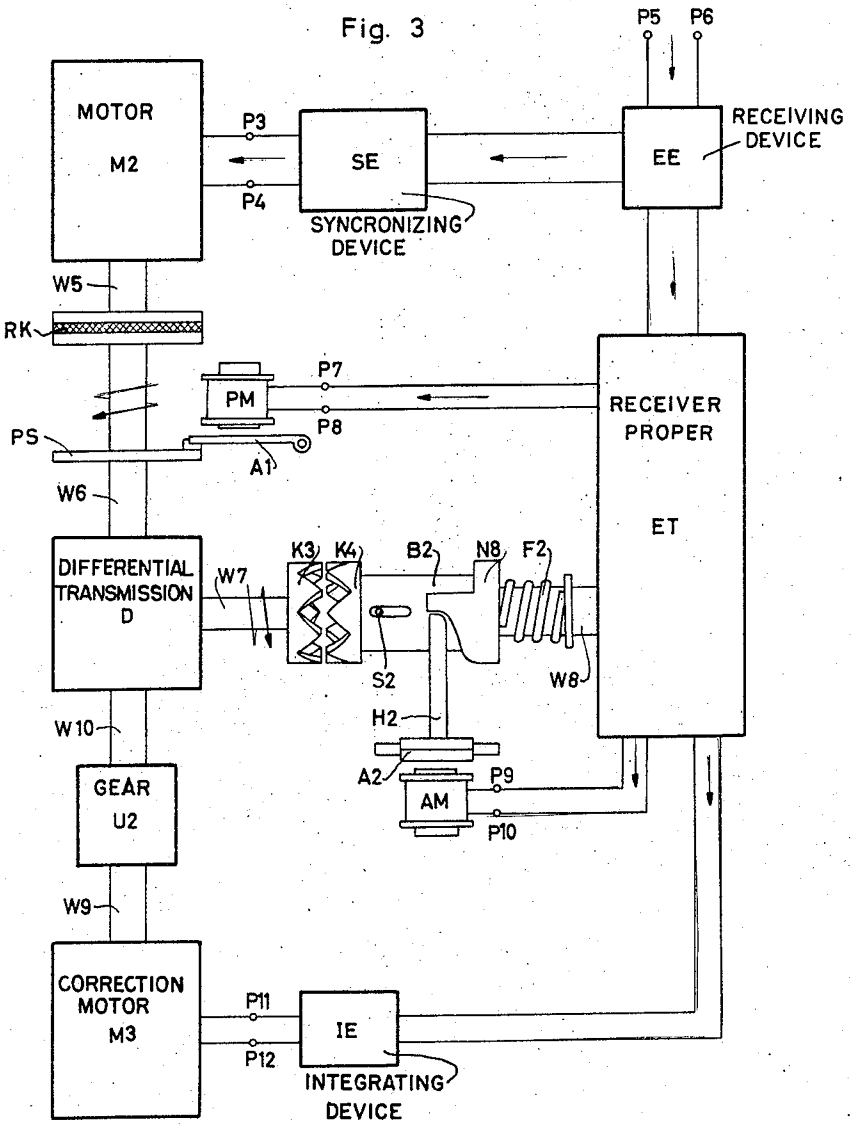

Further details of the invention will now be explained with reference to the accompanying drawings, wherein Figs. 1*a* to 1*d* show diagrams to explain the manner of operation of the teletypewriter system in accordance with the invention as compared with known teletypewriter systems;

Fig. 2 shows an embodiment of the transmitter of a teletypewriter machine employing the invention, all parts not essential for the invention being omitted; and Fig. 3 shows, also diagrammatically, and with the omission of all parts not essential for the invention, one possibility of the use of the invention in the receiver of a teletypewriter machine.

In Fig. 1*a* there is shown in the upper diagram first of all the time transmission scheme of a synchronous telegraph operating with the five-element code. Each complete teletypewriter signal consists in this system of five successive elements of the same length, which are marked in the diagram 1 to 5. Although the showing is in no way intended to be to scale, nevertheless it is assumed that the unit element length is 20 ms. Each signal therefore has a total length of 100 ms. The arrows shown above these starting sides of the first elements of each signal designate the moments when each striking of a key enters into action for the signal which is thereupon transmitted. For the fourth of the signals shown in Fig. 1*a*, it is assumed that the key has been struck so late that gapless connection is not assured. There elapses in this case in the case of synchronous telegraphy, the entire time of one signal length, that is of five element lengths before the transmission of the next signal can commence. The teletypewriter signals therefore can either follow one another without gap or be separated from one another by an integral multiple of a total signal length. In this way the successive transmission of the teletypewriter signals has the form of assignment in a pattern which is invariable with respect to time as shown in the lower diagram of Fig. 1*a*. The effective pattern frequency of this raster results from the reciprocal of the length T of a complete teletypewriter signal and therefore in the case of five unit elements of 20 ms. for each signal, 10 pattern elements per second.

Fig. 1*b* shows the manner of operation of the previously customary start-stop teletypewriter system with unlengthened stop element, taking as basis a unit element lengths also of 20 ms. In this case the characteristic elements, that is, the elements characterizing the individual element signals which are designated 1 to 5, are preceded by a start element A of the same length, the purpose of which is to start the operating tempo controlling for the sending out and evaluation of the following teletypewriter signal—in the case of mechanically operating teletypewriter machine, the operating rotation of the transmitter or receiver shaft. It therefore represents an additional element made necessary by the peculiar nature of the start-stop principle and not in itself required for the formation of the signal and which lengthens the teletypewriter signal. In corresponding manner, in order to assure the stopping and receiving of the transmitting equipment after each teletypewriter signal and to prepare for the release of the next signal, there is required a stop element S which follows the five characteristic elements and in the diagram shown in Fig. 1*b* has the same length as the other elements, but may, in view of special conditions of the transmission, even have a length equal to 1½ times a unit element. In the former case, therefore, a complete teletypewriter signal has the length of seven elements, that is, 140 ms. and in the second case a length of 7.5 elements, that is, 150 ms.

The succession in time of such start-stop teletypewriter signals depends on the manner of operation. As soon as a key actuation in the transmitter mechanism enters into action, the transmission commences with the starting side of the start element as indicated in Fig. 1*b* by the arrows. The spacing in time between two consecutive teletypewriter signals can in this connection assume any desired value. If the key is struck somewhat too early, as is assumed in Fig. 1*b* in connection with the third signal, a key lock enters into action and delays the effect of the striking of the key on the emission of the next signal by a waiting time $t_w$ until the stop element of the preceding teletypewriter signal has come to an end. Only in this case, which practically always represents an exception, can two teletypewriter signals be transmitted directly after each other.

As Fig. 1*b* clearly shows upon comparison with Fig. 1*a*, in a start-stop system according to Fig. 1*b*, one could perhaps consider the individual teleprinter signals as being arranged in a rigid time pattern, which however always begins in a sense with each starting side or flank of a start element and stops with the end of the stop element. For the transmission of successive teleprinter signals, there is no time pattern present. The absence of such a time raster is indeed the characteristic feature of the start-stop systems of the customary type.

Fig. 1*c* shows for comparison the time-diagram for a start-stop teleprinter system operating in accordance with the invention, with an element pattern. Assuming that in addition to the start element a stop element of normal length is also transmitted, the construction of the individual teletypewriter signal is exactly the same as in the case of the previously customary start-stop teletypewriter system in accordance with Fig. 1*b*. The difference, however, is that it is not the moment of the actuation of the key itself which is directly controlling with respect to the time of commencement of a teleprinter signal but rather that the precise moment of the commencement of the transmission of the signal after each key actuation is determined by a laterally invariable element pattern with a raster pulse frequency which corresponds to the unit length of the elements. This element pattern having again a pattern element length T of, for instance, 20 ms. is shown diagrammatically in the lower part of Fig. 1*c*. In this rigid element pattern there are therefore arranged, in accordance with the invention, the teleprinter signals to be transmitted together with all their elements so that after the release of each key, which as previously is effected in an entirely arbitrary manner with respect to time, a given waiting time $t_w$ can elapse before the actual transmission of the released signal commences. It can easily be seen that this waiting time is on the average about one-half of an element length, that is, 10 ms.

By suitable development of the transmitting device, the result can readily be obtained that the waiting time acts within the transmitting teleprinter without being in any way perceptible to the operator. Only when a key is struck too early, for instance, before the completion of the transmission of the preceding signal, will there again enter into action, as in the case of the start-stop teletypewriter machine of the customary construction shown in connection with Fig. 1*b*, a key lock the participation of which in the total waiting time $t_w$ until the commencement of the transmission of the next signal is perceptible in the key actuation. In Fig. 1*c* this is shown for the transition from the second to the third signal.

A comparative consideration of Figs. 1*b* and 1*c* shows that with the assumption, upon which the showing is based, of a key actuation at precisely corresponding times in addition to a certain displacement in time of on the average 10 ms. as a whole, no greater time is required for a signal transmission than a system in accordance with Fig. 1*b*.

The diagram of Fig. 1*d* is based on the assumption that in a teleprinter system in accordance with the invention, in addition to the five characteristic elements of each signal, only the preceding start element is transmitted and that the otherwise customary stop element is dispensed with. It is intentionally assumed that the key actuations take place at precisely the same times as in the system of Fig. 1c and that furthermore the element pattern is precisely identical in phase to that of Fig. 1*c*. The waiting times $t_w$ which are caused by the arranging of the teletypewriter signal elements in the continuous element pattern are then, as can be seen, the same as in the case of Fig. 1*c*; only upon transition from the second to the third signal is the waiting time $t_w$ corresponding to the assumed moment of key actuation, shortened by the length of a unit element since the elimination of the stop step of the second signal can have its effect.

Upon comparison with Fig. 1*c*, it will immediately be seen that the gaps between the signals become greater corresponding to the elimination of the stop elements so that in case of gapless transmission of the signals, the train of signals is compressed so that the transmission line can be better utilized.

An example of a teleprinter transmitter in accordance with the invention is shown in Fig. 2. Only the parts essential for the invention are shown, while all others may be developed in the manner customary in the known teleprinter machines.

For the drive of the teletypewriter machine, there is provided a motor M1 which may, for instance, be connected to a power line N at its terminals P1 and P2. It is particularly advantageous to employ a synchronous motor which is connected to a power line of constant frequency, providing in this way for a constant drive r.p.m. of the teleprinter machine which, by suitable gear means, can be brought into a fixed relationship to the elements of the teleprinter machine which determine the unit element sequence of the transmitter.

In the embodiment shown in Fig. 2, it is assumed, that the motor M1 drives over a shaft W1 and a gear U1 of suitable transmission ratio, a shaft W2 in the direction indicated by the arrow, such shaft being connected by the clutch part K1 of a specially formed clutch. The other clutch part K2 is connected, by means of members to be presently described in further detail, with shaft W3 forming the transmitter shaft, carries in known manner, for instance, a number of cams N1 . . . N6 for the actuation of the transmission contact device in a time sequence which corresponds to the desired element sequence.

The clutch part K2 is connected with a bushing B1 having a longitudinal slot formed therein which is engaged by a by a pin S1 rigidly connected with the shaft W3, so that the bushing B1 can be displaced in longitudinal direction with respect to the shaft W3 while it has a rigid drive connection in rotational direction. The bushing B1 carries a stop cam N7 which may be developed in the manner customary in start-stop teletypewriter machines for releasing the transmitter shaft W3 for one revolution each time as well as its halting again in stop position after each revolution. As control member, there is provided a lock lever H1 carried by shaft W4, which in the position shown holds the lock cam N7 fast and which may be brought into the release position by a slight rotation of the shaft W4. As soon as this release is effected, the bushing B1 is pushed to the left by the pressure of the spring F1 so that the clutch parts K1 and K2 engage to cause the part K2 to be driven by the clutch part K1 so that the transmitter shaft W3 participates in the rotation of the shaft W2; during this rotation of the transmitter shaft W3, which represents one operating cycle of the transmitter, the start element and the other elements of the teleprinter signal to be transmitted are in known manner sent out in the prescribed time sequence by the action of the cams N1 . . . N6. The stopping of the transmitter shaft W3 is effected by the action of the run-on curve of the lock cam N7 which runs onto the lever H1, which in the meantime has returned into the rest position, and in this way is moved toward the right against the force of the spring F1 until finally, carrying along the bushing B1 and the clutch part K2, the stop position shown is again reached.

By the drive of the motor M1 and the transmission ratio between the motor shaft W1 and the shaft W2 connected with the coupling half K1, the result is obtained, that the speed of rotation of the shaft W2 and thus, when the clutch is engaged, also the speed of rotation of the shaft W3 in combination with the cams N1 . . . N6, gives the desired temporal length of the individual elements of the signal sent out. To this extent the operation of the arrangement is still the same as that of the customary start-stop teleprinter machines.

While however, in the case of the latter the clutching must be made with steps which are as fine as possible or frequently even in the form of a step-less jaw clutch, in the case of the embodiment shown in Fig. 2, there is provided a specially developed toothed clutch with unilateral teeth of a number of teeth corresponding to the number of elements per teleprinter signal. There is shown a clutch having seven such teeth, and it is assumed that the continuously rotating clutch shaft W2, due to the suitably selected gear ratio of the transmission U1, carries out one complete revolution always within 140 ms.

Since now, due to the special shape of the teeth which are developed on one side in the manner of saw teeth, the clutch half K2 can be carried along by the clutch half K1 only by contact with the axially directed tooth sides, assurance is provided that the shaft W3, after disengagement of the start-stop cam N7 can be carried along only in given angular positions which correspond in each case to one-seventh of the circumference and therefore to an element pattern of 20 ms. What path in each case the clutch half K1 must traverse after release of the start-stop cam N7 until the rigid driving along of the clutch half K2 takes place, depends on the moment when the key happens to be acutated. It is immediately clear that this free path can be equal at most to one tooth pitch, and will on the average be a half tooth pitch. This path is therefore identical with the average waiting time $t_w$ of 10 ms. which has already been explained in connection with Fig. 1*c*.

In the arrangement shown in Fig. 2, the rotational motion of the seven-partite tooth clutch K1 thus incorporates an element pattern of 20 ms. in which, in each case, after a disengagement of the start-stop cam N7, which takes place at any desired moment, is arranged the actual rotational motion of the transmitter shaft W3 and thus the position of the element transmitted.

The arrangement in accordance with Fig. 2 may also be modified in such a manner that it is suitable for a synchronized start-stop operation without stop element, as has been explained in connection with Fig. 1*d*. In this case, if the same unit element length of 20 ms. is to be maintained, the speed of rotation of the shaft W2 must be corresponding increased and instead of the seven-partite tooth clutch K1, K2, a six-partite tooth clutch may be used. The distribution of the cams N1 . . . N6 (not shown in detail) on shaft W3 must also be correspondingly changed.

The embodiment of Fig. 2 is intended merely to explain the principle of the invention. The details may be changed as desired, provided only that as a result of the construction the result is obtained that upon an arbitrary release of the transmitter, its actual operating cycle commences at a time determined by the rigid element pattern and the individual elements of the signal which is to be sent out during the operating cycle are arranged in a positive manner in the given element pattern. In particular, essential parts of the teleprinter machine need not consist of mechanical means but for instance of electronic means, and the temporally rigid element pattern may be produced not by a mechanical rotational motion of a shaft but by a pulse frequency produced electrically and made available by electrical means. The invention may be realized by arranging the operating cycle produced by electric means and determining the element sequence of the signals sent out in the temporal element pattern after each key actuation or other release by electrical coupling with the pulse frequency which represents the temporally rigid element pattern.

It will also be clear that the invention is not restricted merely to key-actuated transmitters but can find analogous use in all teleprinter equipment operating in accordance with the start-stop principle and serving for the transmission of teleprinter signals composed of binary elements of uniform duration.

Fig. 3 shows an embodiment of a teleprinter machine which is suitable for the evaluation, at the receiver, of the signals transmitted in accordance with the principle of the invention.

For the drive there is provided a motor M2 the driving speed of which must be constant and in fixed relationship to that of the motor of the transmitter. This can be effected by connecting the motor M2 by way of its terminals P3 and P4 either to the same A.C. network as the motor of the transmitter, or, as shown in Fig. 3, to a synchronizing device SE which is fed by the receiver EE in a suitable manner known for telegraph operation.

The receiving device EE is connected at P5 and P6 with the receiving end of the transmission channel (not shown) and conducts the received teleprinter signals to the receiver part proper ET which in known manner must evaluate the individual elements of the received signals and reproduce them in legible form, for instance by printing on a paper tape or a sheet of paper.

The motor M2 drives a shaft W5 which over a slip clutch RK attempts to drive a shaft W6 in the direction indicated by the arrow. However, the shaft W6 is impeded in this rotation upon the connection of the apparatus by a locking disk PS fastened to it, which, by means of a stop arranged in the vicinity of the periphery, comes against the armature A1 of an electromagnetic PM in normal position thereof. This arrangement serves for the phase interception at the commencement of a message transmission; the magnet PM, which is connected at its terminals P7 and P8 with the receiving part ET of the machine, receives from the latter the start element of the first incoming teleprinter signal. The magnet PM accordingly attracts its armature A1 and thus releases the phase disk PS and, together with it, the shaft W6. By suitable switching measures which may be carried out by known means, it must be seen to it that the armature A1 after its first attraction remains in actuated position during the entire balance of the communication connection so that during this connection the shaft W6 can continue to rotate together with the motor shaft W5 in the phase position determined by the first release. The return of the armature A1 into the normal position shown may be controlled, for instance, by the stop signal of the teletypewriter communication or by the stopping of the motor.

There is provided a differential transmission D which also has a suitable transmission ratio, for transmitting the rotation of shaft W6 to the shaft W7, thereby uniformly rotating the clutch half K3 provided with seven symmetric teeth. The speed of rotation of shaft W7 is in this connection so determined by the driving speed of the motor M2 and the interposed transmission, that it rotates once in precisely 140 ms. and thus the seven teeth distributed on the periphery of the clutch half K3 constitute an element pattern which agrees in time with the element pattern at the transmitting end.

The opposite clutch half K4 which also has seven symmetrically shaped teeth, is connected by way of a bushing B2 and the driving pin S2 with the shaft W8 which within the receiver part ET of the teletypewriter machine actuates the members (developed in the known manner and therefore not shown in detail) for the distribution, evaluation and translation of the teleprinter signals received. The coupling is effected incident to the start element of each signal, by the energization of the release magnet AM, connected P9 and P10 with the receiving part ET, to cause attraction of its armature A2 so as to move the lever H2 for releasing the holding cam N8. The bushing B2, due to this release, is moved to the left under the force of the spring F2 until the teeth of the clutch half K4 engage in the teeth of the clutch half K3 rotating at constant speed. Due to the symmetrical shape of the teeth, the shaft W8, in the coupling position, can assume only a phase position with respect to the shaft W7 which corresponds to the pattern division of 20 ms., the shaft W7, as already described having been brought into correct phase relationship to the element pattern of the transmitter, by the phase interception upon receipt of the start element of the first teleprinter signal.

During the rotation of the shaft W8 which now takes place and which corresponds to one operating cycle of th receiver, there is effected the scanning of the individual elements of the received signal as well as their evaluation and translation until the corresponding character is printed in the manner customary in teleprinter machines and therefore not explained in further detail here. After the rotation, the oblique edge of the holding cam N8 runs onto the locking lever H2 which in the meantime has returned into the normal position, so that upon reaching the locking position shown, the clutch half K4 is again disengaged from the clutch half K3.

The release of the shaft W8 by the release magnet AM, incident to each signal, is thus controlled in the manner customary in normal teleprinter machines as a function of the starter element of the corresponding signal, but the exact phase position of the shaft W8 during its rotation is not dependent on any distortion of the starting side of this start element which might be present, since the phase position of the shaft W8 during rotation is fixed, as a result of the special shape of the teeth of the clutch halves K3 and K4, by the rotation of shaft W7 which agrees with the element pattern at the transmitter.

A prerequisite for the correct operation of the arrangement of the operating cycle of the receiver in an element pattern which agrees with the transmission element raster is naturally that not only the speed of rotation but also the phase position of shaft W7 is in agreement with the element raster determined by the transmitter and remains so for the entire duration of the communication.

The supervision of this phase agreement is afforded by a special phase-control device which can be for instance of the form shown in Fig. 3. This embodiment is based on the assumption that within the receiving part ET of the teleprinter machine there is provided known means for continuously comparing the position in time of the element sides of the received signals with the corresponding moments of each operating cycle (for instance each revolution of shaft W8) and for feeding upon each leading or lagging deviation in time, a corresponding positive or negative correction pulse to an integrating device IE, shown at the bottom of Fig. 3. It has the purpose of integrating over a given period of time of for instance several teleprinter signal lengths the correction pulses fed which can vary continuously between positive and negative values, particularly in case of irregular distortions, and of forming an average value which gives a corresponding positive or negative correction signal differing from the value of zero, for instance in the form of a control voltage, only in case of frequent preponderance of positive or negative correction pulses.

This control pulse may be fed over the terminals P11 and P12, for instance, to a correction motor M3 which turns to the right or to the left corresponding to the direction of the correction signal, and transmits this rotary motion over shaft W9 and a gear U2, having a suitable transmission ratio, to the input shaft W10 of the differential transmission D. This differential transmission developed so as to produce, responsive to rotation of the shaft W10 in positive or negative direction, a corresponding phase shift between shafts W6 and W7.

The control circuit described for the phase correction has the effect that phase errors noted currently upon reception of a teleprinter communication between the element sides of the received signals and the element pattern, stipulated by the rotation of the shaft W7 or the coupling half K3 for the evaluation at the receiver, automatically produce a correction of the phase position of this element pattern in the desired direction. Furthermore, any possible phase error which may be caused upon phase interception by a distortion of the start element of the first signal is corrected by this correction device during the first signal of the teleprinter message.

The correction device shown in Fig. 3 is intended only as one example of many possible embodiments. Thus, the mechanical differential may be replaced by electrical phase correction means, for instance, a phase shifter in the feed line of the motor M2. There may furthermore be used, for instance, a purely mechanically operating correction device which operates similarly to the known Hughes apparatus with a correction cog fastened on the receiver shaft and a correction gear wheel coming into engagement with such cog and fastened on the driving shaft.

It is also possible to use for the production of the element pattern means which operate purely electrically in that similarly to the aforementioned possible embodiments of the transmitting end, the necessary element pattern is provided also at the receiver, by an electronic device in the form of pulses which follow each other at a given rate and in that the evaluation of each signal is coupled electrically with such pattern pulse. The phase supervision and phase correction of the pattern pulse at the receiver may in this connection also be effected by electronic means for determining and evaluating the differences between the element sides of the received signals and the corresponding times of the pattern pulse.

When the receiving device shown in Fig. 3 is to be used for the reception of element-synchronized teleprinter signals without stop element in accordance with Fig. 1*d*, it will be necessary, as already explained in connection with Fig. 2 with regard to the transmitting end, that there be used at the receiving end a tooth coupling having only six parts, the speed of rotation of which must naturally also be adjusted in the ratio of 6:7.

One particularly simple and advantageous embodiment of the teleprinters in accordance with the invention may be obtained in a system of limited extent, if a common A.C. network, for instance, of a frequency of 50 c.p.s., is available for driving the drive motors for all connected subscribers. Special phase-interception and phase-correction devices may then be dispensed with.

Changes may be made within the scope and spirit of the appended claims.

I claim:

1. A teleprinter system operating in accordance with the start-stop principle for the transmission of signals which are composed of binary elements of uniform duration, comprising means for transmitting the teleprinter signals with the elements thereof disposed in a time pattern of fixed time relationship and having a pulse frequency corresponding to the reciprocal of the desired element length, means for maintaining said time pattern in fixed phase relationship to a drive criterion of the transmitting teleprinter, a teleprinter receiver having a teleprinter machine constructed for operation within a time pattern of rigid time relationship corresponding to that of the transmitter, means controlled by the start element of a signal being transmitted for releasing the teleprinter machine of said receiver to execute an operating cycle, means for bringing said receiver time pattern into phase synchronism with the time pattern of said transmitter, and means controlled by the time pattern of said receiver for controlling the evaluation of the individual elements of the signal.

2. A system and cooperation of parts according to claim 1, wherein predetermined drive criteria of interconnected teleprinters which are independently receivable for start-stop operation are during communication synchronized.

3. A system and cooperation of parts according to claim 2, comprising integrating means for synchronizing the receiving teleprinter responsive to commencement of the element of the incoming teleprinter signal.

4. A system and cooperation of parts according to claim 1, wherein the element time pattern in said receiver is in fixed relationship to the synchronized drive criterion, and means for currently correcting said relationship upon the commencement of the elements of the received signals.

5. A system and cooperation of parts according to claim 4, comprising integrating means for said phase correction.

6. A system and cooperation of parts according to claim 4, comprising means controlled by the start element of the first teleprinter signal received for bringing said receiver time pattern element into synchronism.

7. A system and cooperation of parts according to claim 1, comprising a transmitter distributor with constant drive therefor, a toothed start-stop clutch member for coupling said distributor with said drive, the tooth pitch of said member corresponding to the desired element time pattern and the number of teeth thereof corresponding to the number of units elements of a teleprinter signal.

8. A system and cooperation of parts according to claim 1, comprising a rotatable shaft in said receiver, a receiver distributor, and a toothed start-stop clutch for coupling said shaft with said distributor, the tooth pitch of said clutch corresponding to the desired element time pattern.

9. A system and cooperation of parts according to claim 1, comprising a receiver drive shaft, a motor, a receiver distributor, a phase interception clutch for coupling said shaft for operative actuation thereof, and means for actuating said clutch incident to the receipt of the start element of the first incoming signal for coupling said distributor with said drive shaft in a desired phase position of the element time pattern.

10. A system and cooperation of parts according to claim 9, comprising a switching device for controlling the actuation of said clutch, and means for operating said switching device responsive to receipt of the start element of the first incoming teleprinter signal.

11. A system and cooperation of parts according to claim 1, wherein transmission of stop elements is omitted.

References Cited in the file of this patent

UNITED STATES PATENTS

| | | |
|---|---|---|
| 1,832,309 | Knoop | Nov. 17, 1931 |
| 1,909,838 | Lane | May 16, 1933 |
| 2,275,974 | Mathes | Mar. 10, 1942 |
| 2,530,516 | Finch | Nov. 21, 1950 |
| 2,543,787 | Long | Mar. 6, 1951 |